US010351456B2

(12) United States Patent
Singh (10) Patent No.: US 10,351,456 B2
(45) Date of Patent: Jul. 16, 2019

(54) PROCESS FOR TREATMENT OF SOUR WATER GENERATED FROM COAL GASIFICATION

(71) Applicant: Fluor Technologies Corporation, Sugar Land, TX (US)

(72) Inventor: Raj Bhadra Singh, New Delhi (IN)

(73) Assignee: Fluor Technologies Corporation, Sugar Land, TX (US)

(*) Notice: Subject to any disclaimer, the term of this patent is extended or adjusted under 35 U.S.C. 154(b) by 18 days.

(21) Appl. No.: 15/372,010

(22) Filed: Dec. 7, 2016

(65) Prior Publication Data

US 2017/0166469 A1   Jun. 15, 2017

(30) Foreign Application Priority Data

Dec. 14, 2015   (IN) .......................... 4689/MUM/2015

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/004* (2013.01); *C02F 1/20* (2013.01); *C02F 1/283* (2013.01);
(Continued)

(58) Field of Classification Search
CPC .. C02F 1/004; C02F 1/20; C02F 1/283; C02F 1/5236; C02F 1/66; C02F 1/68;
(Continued)

(56) References Cited

U.S. PATENT DOCUMENTS 3,804,757 A    4/1974  Ruschenburg
4,239,620 A   12/1980  Doll et al.
(Continued)

FOREIGN PATENT DOCUMENTS

CN          101597092 A   12/2009
IN     4689/MUM/2015 A    6/2017
(Continued)

OTHER PUBLICATIONS

International Application No. PCT/US2016/065621, International Search Report, dated Mar. 30, 3017, 3 pages.
(Continued)

*Primary Examiner* — Dirk R Bass
(74) *Attorney, Agent, or Firm* — Conley Rose, PC (57) ABSTRACT

A method of treating sour water from industrial processes such as coal gasification. The method includes injecting a polysulfide into a sour water stream to convert cyanide to thiocyanate, thereby reducing the corrosiveness and toxicity of the sour water stream. The method also includes the step of mixing the sour water stream with a reactant to remove $CO_2$ in its various forms in a reaction tank and subsequently routing the stream to a solid settler. The method further includes adjusting the pH of the sour stream in a pH correction tank before sending the sour water stream through a stream stripper for $H_2S$ and/or $NH_3$ removal. After passing through the stripper, the treated sour water stream is sent to a biological treatment process for thiocyanate and formate removal. Subsequent treatment steps can be applied, such as multi-grade filters and activated carbon filters, to prepare the treated sour water for reuse.

20 Claims, 8 Drawing Sheets

(51) Int. Cl.
*C02F 1/20* (2006.01)
*C02F 1/28* (2006.01)
*C02F 1/52* (2006.01)
*C02F 1/66* (2006.01)
*C02F 1/68* (2006.01)
*C02F 3/02* (2006.01)
*C02F 101/10* (2006.01)
*C02F 101/18* (2006.01)
*C02F 103/34* (2006.01)
*C02F 103/36* (2006.01)

(52) U.S. Cl.
CPC .............. *C02F 1/5236* (2013.01); *C02F 1/66* (2013.01); *C02F 1/68* (2013.01); *C02F 3/02* (2013.01); *C02F 2001/007* (2013.01); *C02F 2101/10* (2013.01); *C02F 2101/18* (2013.01); *C02F 2103/34* (2013.01); *C02F 2103/365* (2013.01); *Y02E 20/16* (2013.01); *Y02E 20/18* (2013.01); *Y02W 10/15* (2015.05)

(58) Field of Classification Search
CPC ............ C02F 2001/007; C02F 2101/10; C02F 2101/18; C02F 2103/34; C02F 2103/365; C02F 3/02; C02F 9/00; Y02E 20/16; Y02E 20/18; Y02W 10/15
See application file for complete search history.

(56) References Cited

U.S. PATENT DOCUMENTS

| | | |
|---|---|---|
| 4,253,928 A | 3/1981 | Blytas et al. |
| 4,505,881 A | 3/1985 | Diaz |
| 4,737,289 A | 4/1988 | Castaldi et al. |
| 4,746,434 A | 5/1988 | Grieves et al. |
| 5,431,877 A | 7/1995 | Brucken et al. |
| 2003/0172708 A1* | 9/2003 | Spencer ................ B21D 53/84 72/335 |
| 2011/0186489 A1 | 8/2011 | Kain et al. |
| 2014/0047975 A1* | 2/2014 | Mazumdar ................ C02F 1/66 95/1 |
| 2015/0377079 A1* | 12/2015 | Noureldin .................. C10J 3/82 60/671 |

FOREIGN PATENT DOCUMENTS

| | | |
|---|---|---|
| WO | 2014031287 A1 | 2/2014 |
| WO | 2017106007 A1 | 6/2017 |

OTHER PUBLICATIONS

International Application No. PCT/US2016/065621, Written Opinion of the International Searching Authrity, dated Mar. 30, 3017, 10 pages.

International Patent Application No. PCT/US2016/065621, International Preliminary Report on Patentability dated Jun. 28, 2018, 12 pages.

* cited by examiner

PROCESS FOR TREATMENT OF SOUR WATER GENERATED FROM COAL GASIFICATION

CROSS-REFERENCE TO RELATED APPLICATIONS

This application claims priority benefit to India Patent Application Serial No. 4689/MUM/2015, filed on Dec. 14, 2015, and entitled "PROCESS FOR TREATMENT OF SOUR WATER GENERATED FROM COAL GASIFICATION", which is hereby incorporated by reference for all purposes as if reproduced in its entirety.

FIELD OF THE INVENTION

The field of the invention is sour water treatment.

BACKGROUND

The background description includes information that may be useful in understanding the present invention. It is not an admission that any of the information provided herein is prior art or relevant to the presently claimed invention, or that any publication specifically or implicitly referenced is prior art. These and all other extrinsic materials discussed herein are incorporated by reference in their entirety. Where a definition or use of a term in an incorporated reference is inconsistent or contrary to the definition of that term provided herein, the definition of that term provided herein applies, and the definition of that term in the reference does not apply.

Coal gasification is the process of converting coal into a fuel gas mixture commonly referred to as "syngas" or "synthesis gas". Syngas primarily consists of hydrogen, methane ($CH_4$), carbon monoxide (CO), and water vapor, and is highly combustible. Syngas can be burned to generate heat for various applications, including cooking, illumination, and electricity generation. Large-scale coal gasification is primarily used for the latter and is responsible for supplying a significant portion of our electricity consumption.

Unfortunately, coal gasification has many harmful by-products that can negatively impact the environment. One of those by-products is "sour water" (also "grey water" or "waste water") which is produced when water is used to quench, cool, and/or clean syngas. Sour water can contain high amounts of ammonia ($NH_3$), hydrogen sulfide ($H_2S$), thiosulfate, cyanides, chlorides, fluorides, carbon dioxide, and carbonates. Sour water may also contain suspended solids and minerals such as calcium, magnesium, and silica. In addition, sour water can contain significant levels of tar and organics such as mixed phenols. The exact composition of sour water will depend on coal composition, type of gasifier (e.g., temperature/pressure, slagging/non-slagging, wet/dry type particulate removal, etc.).

Various methods for treating and/or disposing of sour water are known. For example, CN101597092, U.S. Pat. Nos. 3,804,757, 4,253,928 describe several methods of treating coal gasification wastewater using a steam stripping tower. As another example, U.S. Pat. No. 4,239,620 discusses methods of removing cyanide from sour water. As yet another example, U.S. Pat. No. 4,746,434 describes a method of biologically treating sour water prior to disposal.

One of the problems associated with sour water treatment is its tendency to corrode process devices (e.g., stripper towers, conduits, etc.), cause scaling, and exert toxicity on downstream biological treatment section(s) or in the environmental receptors of the treated sour water. U.S. Pat. No. 4,505,881 describes converting cyanide into ammonium thiocyanate prior to routing the sour water to a stripper for H2S and NH3 removal. This approach helps somewhat to address corrosion in the stripper; however, it requires a post-hydrolysis process after the stripper to remove ammonium thiocyanate. This is disadvantageous because the temperature required for hydrolysis uses energy. Similar approaches are described in U.S. Pat. Nos. 4,737,289 and 5,431,877. Unfortunately, these methods suffer from similar drawbacks.

Current processes and systems for handling sour water in an environmental fashion are not well evolved. A growing awareness of our environmental footprint has led to the need and desire for better methods of treating sour water.

Thus, there is still a need for improved methods and systems for treating sour water produced from industrial processes such as coal gasification.

SUMMARY OF THE INVENTION

The inventive subject matter provides apparatus, systems, and methods in which one can pre-treat a sour water stream originating from a coal gasification process so that the treated sour water stream can be reused. The process can be used for sour water streams that contain cyanides, carbon dioxide, carbonates, chlorides, fluorides, calcium, magnesium, silica, suspended solids, tar, organics, mixed phenols, and other contaminants.

In one aspect, the method includes the step of injecting ammonium polysulfide into the sour water stream in an amount effective to convert at least some of the cyanides into thiocyanate. In some embodiments, the ammonium polysulfide is injected into the sour water stream via an atomized nozzle so that the ammonium polysulfide is atomized, thus increasing the surface area contact with cyanide. The ammonium polysulfide can be injected into the sour water stream in a direction that is either counter to, or the same as, the direction of flow of the sour water stream, depending on the composition of the sour water and the downstream processes. The sour water stream is preferably routed to an equalization tank prior to injecting ammonium polysulfide in order to better control variations in flow rate, temperature, and contaminant concentrations, and to improve the performance of downstream processes.

In another aspect, the method further includes the steps of routing the sour water stream to a reaction tank after ammonium polysulfide injection and then treating the inorganic carbon present in various forms of dissolved carbon dioxide (carbonic acid, bicarbonate, carbonate). Syngas contains significant levels of $CO_2$, which dissolve in sour water. While this is not toxic or regulated, it does cause scaling in the downstream treatment sections and also needs to be removed for re-use of treated sour water. These are present as salts combined with Calcium, magnesium and silicon, which are present in the ash phase of coal being gasified. In addition to being combined with various forms of $CO_2$, the Ca, Mg, and Silica can also be present combined with chlorides and sulfate present in the sour water. All these contribute to carbonate and noncarbonate hardness of sour water and can cause significant scaling in the sour water stripper trays downstream. The removal of $CO_2$ in its various forms and other scale-forming components is accomplished by adding lime, soda ash, sodium hydroxide (NaOH), calcium chloride (CaCl2), or any other compound suitable for precipitating the scale-forming salts. Preferably, the sour water stream and ammonium polysulfide is allowed sufficient time to reach a homogenous mixture and react with one another prior to routing the sour water stream to the reaction tank. This can be accomplished by providing a sufficient length of conduit between the injection and the reaction tank. However, it is also contemplated that mixing and reacting of the ammonium polysulfide and cyanide can continue to completion in the reaction tank. The reaction tank preferably has a mixture that can be operated to facilitate mixture of the various scale-forming salts and the lime, soda ash (and any other additives or constituents such as commercially available coagulants and flocculants).

Once a batch of sour water stream has been sufficiently mixed in the reaction tank, the batch of sour water stream can be routed to a solid settler to separate solid particles from the sour water stream.

In yet other aspects, the method of pre-treating sour water includes the steps of routing the sour water stream from the solid settler to a pH correction tank and injecting an acid into the pH correction tank in an amount that is sufficient to bring the sour water stream to a pH of 7-10. pH correction helps control scaling in downstream equipment and also in removal of $H_2S$ and cyanides in the low pH stages of stripper. The pH correction tank preferably has a mixer for mixing a batch of the acid and the sour water stream in the pH correction tank for a period of time that is sufficient to raise the pH.

Once the pH of the sour water stream has been corrected, the sour water stream can be routed to a multi-grade filter to remove suspended solids from the sour water stream. The sour water stream can then be routed to a feed tank in preparation for a stripping process. Various stripping processes are contemplated, including a one-stage sour water stripper configured to simultaneously remove $H_2S$, cyanides and $NH_3$, and a two-stage sour water stripper configured to remove $H_2S$, cyanides in first stage, and $NH_3$ in separate strippers.

After the sour water stream has been through a stripping process, the sour water is routed to a biological treatment tank to remove at least some of the thiocyanate that does not get stripped in the upstream stripper. The substantially thiocyanate-depleted water stream is then routed from the biological process tank to a clarifier where coagulants are added to produce a coagulated thiocyanate-depleted water stream. The coagulated thiocyanate-depleted water stream is then routed to a multi-grade filter to remove solids. Finally, the stream is routed to an activated carbon filter to remove at least some organics in the stream to produce a treated and reusable water stream.

Various objects, features, aspects, and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including providing a method of pre-treating sour water prior to a stripping process to prevent scaling and corrosion of the stripper and prevent biological system upsets due to presence of free cyanides.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
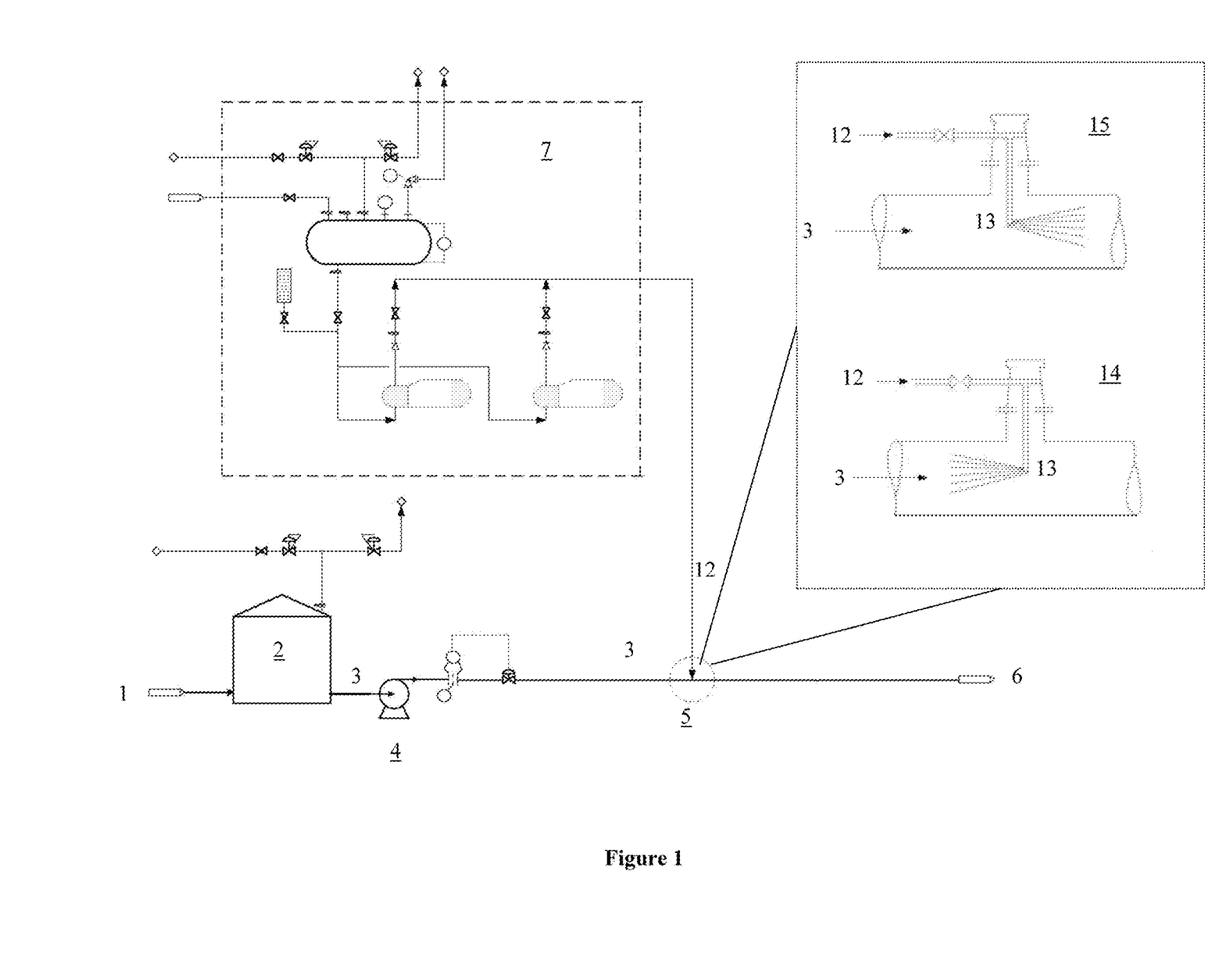
FIG. 1 is a schematic of a process for converting cyanide into thiocyanate in a sour water stream.

FIG. 1 shows a process of pre-treating a sour water stream 1. Stream 1 comprises waste water (also referred to as "grey water") produced from an industrial process such as coal gasification, petcoke gasification, and integrated gasification combined cycle (IGCC) power plants. Depending on the industrial process, stream 1 may contain various chemicals, compounds, minerals, and other constituents that are harmful to the environment or that prevent reuse of the sour water stream 1. In the case of coal gasification, stream 1 may contain ammonia ($NH_3$), hydrogen sulfide ($H_2S$), thiosulfate, cyanides, chlorides, fluorides, carbon dioxide, carbonates, suspended solids, minerals (e.g., calcium, magnesium, silica), tar, and organics (e.g., mixed phenols). The exact amount of each of these constituents will depend on coal composition, type of gasifier (e.g., slagging/non-slagging, wet/dry type particulate removal, etc.), and process parameters (e.g., temperature, pressure).

The first step of the process of FIG. 1 is to route sour water stream 1 to an equalization tank 2, wherein the flow rate, pH, temperature, and contaminant concentrations are controlled and equalized to improve the performance of downstream processes. Equalization tank 2 can be coupled with one or more sensors for sensing the characteristics of stream 1 just upstream of tank 2 and/or the characteristics of the stream 1 inside tank 2. Sensor data can be used to adjust equalization parameters of tank 2. In addition, equalization tank 2 also has inert gas blanketing using pressure control valves to prevent release of toxic/odorous gases to the environment. If stream 1 originates from a source with little variation in characteristics, then equalization tank 2 could be bypassed or eliminated.

Once a batch of stream 1 has been equalized, pump 4 moves the equalized sour water stream 3 from tank 2 to injection point 5 where an amount of ammonium polysulfide 12 is introduced into stream 3. The amount of ammonium polysulfide 12 (e.g., volume flow rate) is sufficient to convert at least some of the cyanide into thiocyanate, thereby reducing the corrosivity of stream 3. As stream 3 travels farther downstream from injection point 5, the ammonium polysulfide 12 mixes with cyanide in stream 3 until a substantially "free" cyanide free sour water stream 6 is produced.

Polysulfide injection package 7 produces a polysulfide stream 12. Stream 12 contains a polysulfide that is capable of converting cyanides into thiocyanate. In some embodiments, stream 12 substantially comprises ammonium polysulfide. Stream 12 is introduced into stream 3 using an atomizer nozzle 13 to improve the surface contact between the ammonium polysulfide 12 and cyanide. However, those of ordinary skill in the art will appreciate that other injection techniques may be applied to the inventive principles of the present inventive subject matter. Preferred injection techniques will promote mixing and will prevent settling of the polysulfide on pipe walls by injecting into the center of the pipe/tank. Other forms of polysulfides such as sodium polysulfide, calcium polysulfide, and potassium polysulfide can also be used. Polysulfides are a general class of compounds of sulfur that contain more sulfur than is required by normal valency of associated metal. However, ammonium polysulfide is preferred for ease of removal in subsequent steps.

The ammonium polysulfide 12 can be injected into stream 3 in a counter-flow direction 14 or a concurrent-flow direction 15, depending on desired mixing characteristics. Concurrent-flow configurations can be used in some embodiments to prevent nozzle clogging.

Figure 2:
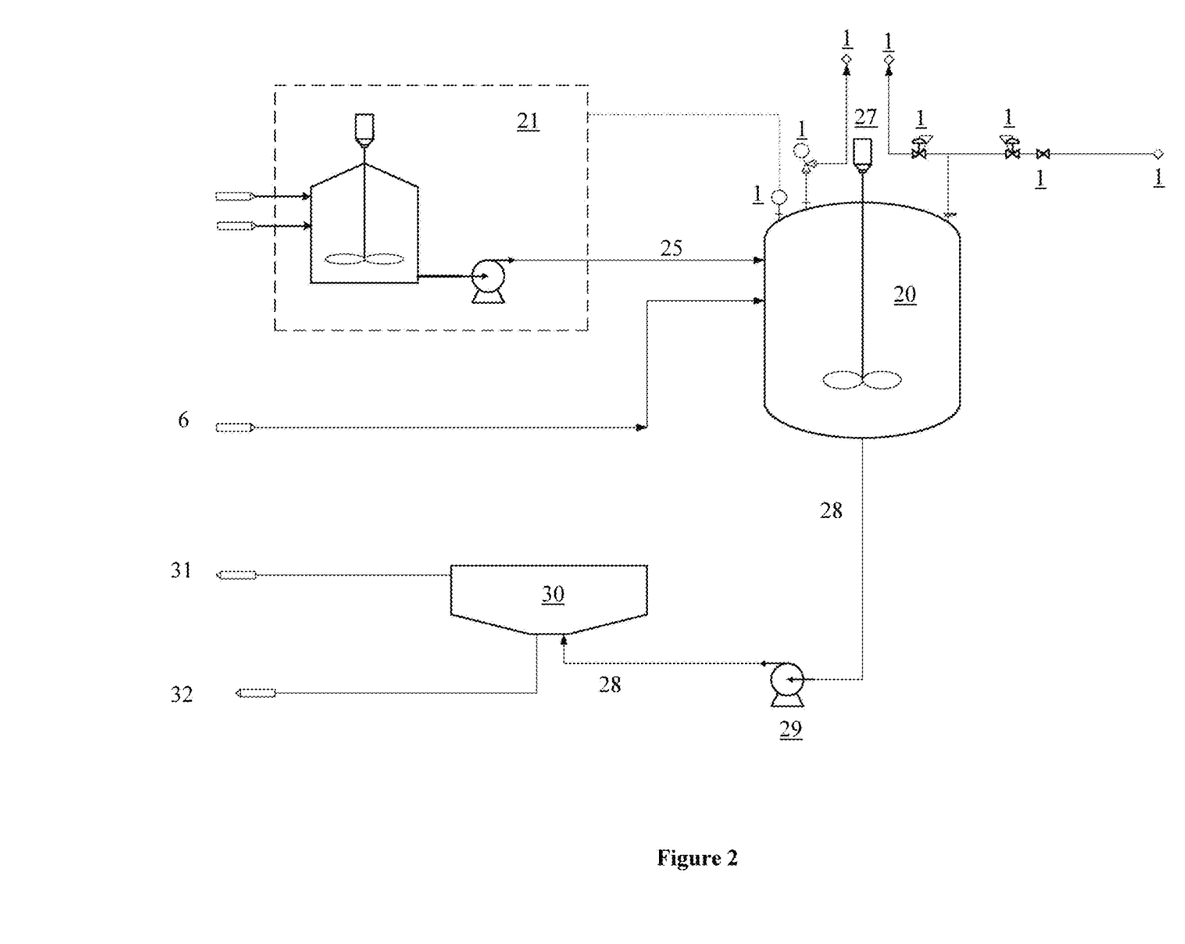
FIG. 2 is a schematic of a $CO_2$ removal process for a sour water stream.

FIG. 2 shows an additional process of pre-treating sour water stream 1. After the ammonium polysulfide 12 has been injected into stream 3 to produce sour water stream 6 with substantially reduced free cyanide, stream 6 is then routed to a reaction tank 20. Lime injection package 21 produces a precipitation stream 25 that is capable of precipitating $CO_2$ in its various forms. Stream 25 is also routed to tank 20 where stream 6 and stream 25 mix. Stream 25 removes scale-forming inorganic carbon ($CO_2$ in its various forms such as bicarbonates and carbonates) and other noncarbonate hardness from stream 6 via precipitation until stream 6 is substantially depleted of these scale forming salts. In addition, stream 25 is preferably configured to precipitate bicarbonates from stream 6 and release bound ammonia in stream 6. Contemplated scale removing reactants include lime, soda ash, NaOH, $CaCl_2$, and sodium aluminate. Commercially available coagulants and flocculants help in removal of precipitated solids in the solids settler.

Tank 20 includes a mixer 27 that can be operated to facilitate mixing of stream 6 and stream 25. The process may be carried out batchwise or continuously, but continuous is preferred. Whether batch or continuous, the contacting and conversion are carried out for a time sufficient for the reactions to occur. This time may vary with the concentrations and actual temperatures employed. The continuous operation is carried out in such manner that a given portion of solution in passing through the reaction zone in the reactor has an average residence time as required for the reaction. Stream 6 and stream 25 can be contacted for a period of time and under operating conditions (e.g., pressure, temperature) that optimize precipitation of scale forming components including various forms of $CO_2$. Mixing conditions are also configured to allow for the precipitation of minerals such as magnesium, calcium, and silica from stream 3, as follows:

$$CO_2 + Ca(OH)_2 = CaCO_3^- + H_2O$$
carbon dioxide + calcium hydroxide = calcium carbonate + water In addition, conditions are also preferably configured to allow for precipitation of fluoride as calcium fluoride, as follows:

In alternative embodiments, tank 20 can be replaced with a series of reaction tanks that operate at different temperatures or pressures configured to optimize the removal of specific minerals and constituents in stages.

There may be some incidental off gases in reaction tank 20. As such, tank 20 can be equipped with pressure control valves and other necessary components to prevent environmental hazards. However, a major portion of the off gases will be stripped in the stripper.

Once stream 6 and stream 25 have had time to mix, pump 29 routes the mixed stream 28 from tank 20 to a solid settler 30. Stream 28 is substantially depleted of inorganic carbon, silica, and other scale-forming components. Once stream 28 enters solid settler 30, stream 28 is allowed to sit for a time so that heavier components such as solids and salts (e.g., CaCO3, $CaMgCO_3$, $CaF_2$) can sink to the bottom and separate from water and lighter components. The pressure, temperature, and residence time in solid settler 30 will depend on the influent composition. In some embodiments, it is contemplated that solid settler 30 is operated within a pressure range of 0-3 kg/cm2 (ga) and temperature range of 100°-120° C. in order to optimize removal of inorganic carbon and other scale-forming components from the pre-treated sour water stream 31. A pre-treated sour water stream 31, which mostly contains NH3, H2S, formate, thiocyanate, etc. is then routed from the top of solid settler 30 to a pH correction process. In addition, a sludge/slurry stream 32, which mostly contains CaCO3, is routed from the bottom of solid settler 30 to a disposal process.

Figure 3:
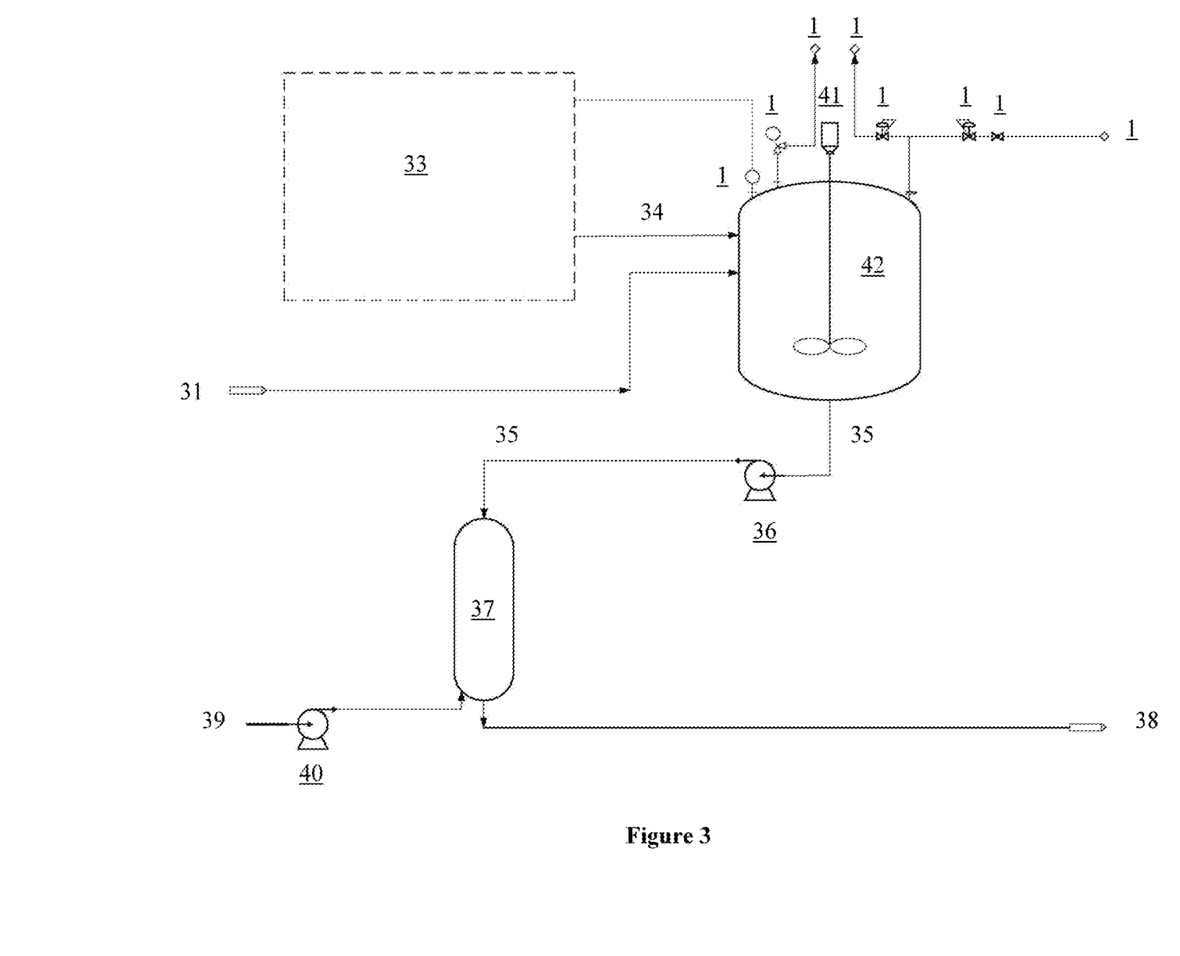
FIG. 3 is a schematic of a pH correction process for a sour water stream.

FIG. 3 shows a pH correction process for stream 31. In particular, acid dosing skid 33 produces a stream 31 that is routed to a pH correction tank 42, where it is mixed with an acid stream 34 to raise pH levels up to 7-10, depending on the composition of stream 31 and downstream processes. The primary objective is to prevent scaling in the filter and downstream treatment and also promote stripping of $H_2S$ and residual HCN. Tank 42 has a mixer 41 to facilitate mixing of stream 31 and stream 34. The pressure, temperature, and residency time in tank 42 will depend on the composition of stream 31 and downstream process parameters. In some embodiments, tank 42 is operated at a pressure of [0-3 kg/cm2 (ga)] and at a temperature of [100°-120° C.] to optimize pH correction for a stream consisting essentially of NH3, H2S, formate, thiocyanate, etc.

Pump 36 moves a pH corrected sour water stream 35 from tank 42 to a multi-grade filter 37 for removal of residual suspended solids such as calcium carbonate, calcium fluoride, etc. Pre-treated and pH corrected sour water stream 38 is then routed to a stripper process. Multi-grade filter 37 has a back wash pump 40 for flushing a stream 39 upstream through filter 37 to clean and remove solids from the filter membranes.

Figure 4:
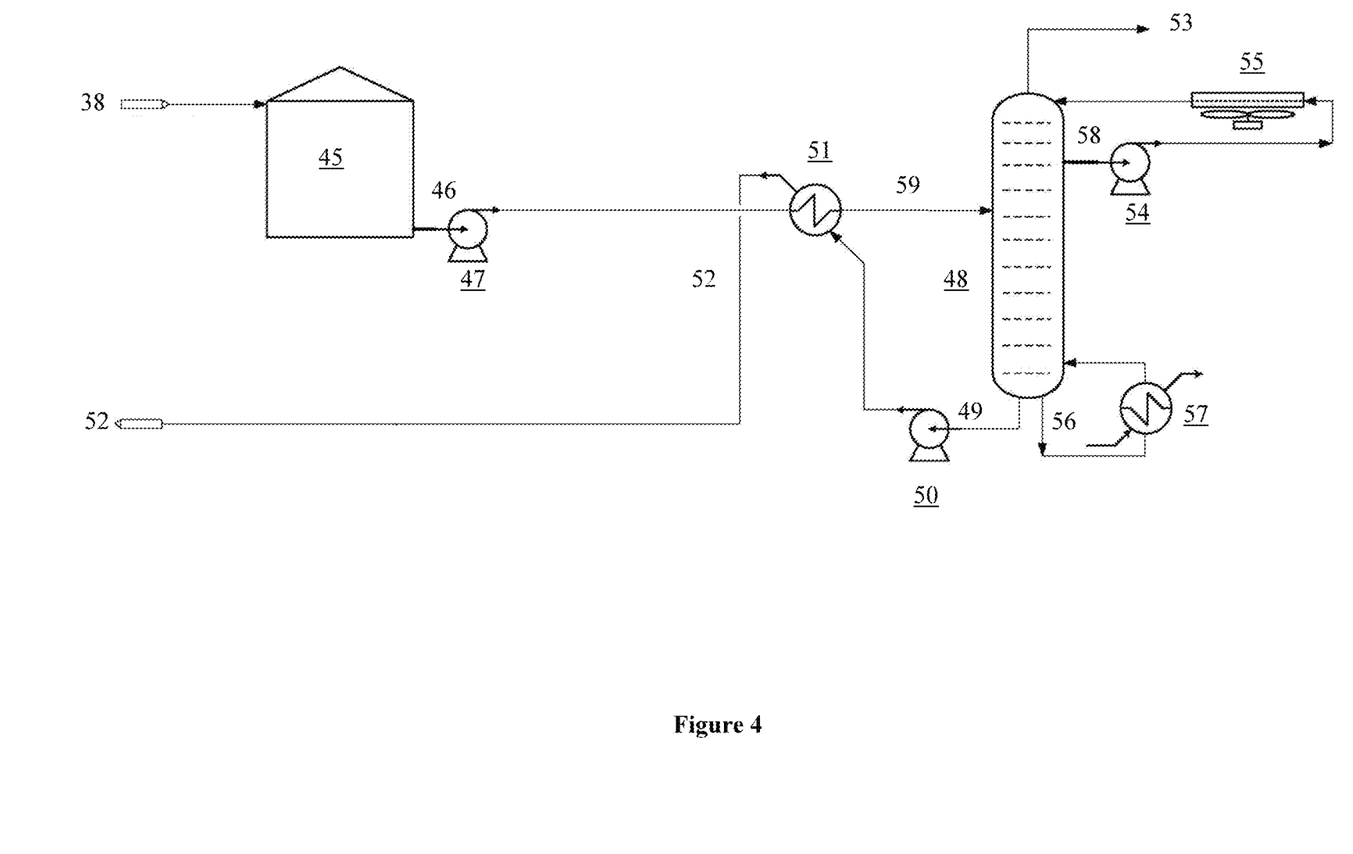
FIG. 4 is a schematic of a single stage sour water stripper.

FIG. 4 shows a single column steam stripper process for treating stream 38. First, stream 38 is routed to a feed tank 45 where a sufficient volume of sour water is accumulated prior to the stripper process. Feed tank 45 can also be configured to maintain a constant temperature, pressure, and flow rate for the stripper process. A pump 47 routes a stream 46 from tank 45 to a heat exchanger 51 where stream 46 is heated to a higher temperature stream 59 before feeding into a top region of stripper 48. As stream 59 falls to the bottom of stripper 48, rising steam removes contaminants from sour water stream 59. In some embodiments, the pressure and temperature of stripper 48 is selected to optimize the removal of either $H_2S$ or $NH_3$, or both simultaneously. A top stream 53, which is rich in one or more contaminants (e.g., $H_2S$, $NH_3$) exits the top of stripper 48 for use, disposal, or additional processing. Pump 54 draws a liquid stream 58 comprising mostly dissolved $H_2S$ and/or $NH_3$ from the top of stripper 48 and through a condenser 55 for reflux/cooling. Liquid stream 58 is cooled to a liquid and fed back into the top of stripper 48 as reflux to the stripper. Bottom stream 49, which is substantially free of one or more contaminants, is pumped from the bottom of stripper 48 by pump 50 and into heat exchanger 51 to heat stream 46. Cooled stream 52 is then sent for further processing. Stripper 48 also has a reboiler stream 56, which is pulled from the bottom of stripper 48 and heated in a heat exchanger 57 before being routed back into the bottom of stripper 48. Reboiler stream 56 and heat exchanger 57 help to maintain the pool of liquid at the bottom of stripper 48 at a desired temperature to generate steam.

If a single column stripper is used with the current inventive subject matter, a provision for caustic dosing will be provided before the liquid comes to lower stages. This is to free bound $NH_3$. The exact stage of caustic addition will depend on specific parameters of flue gas content.

Figure 5:
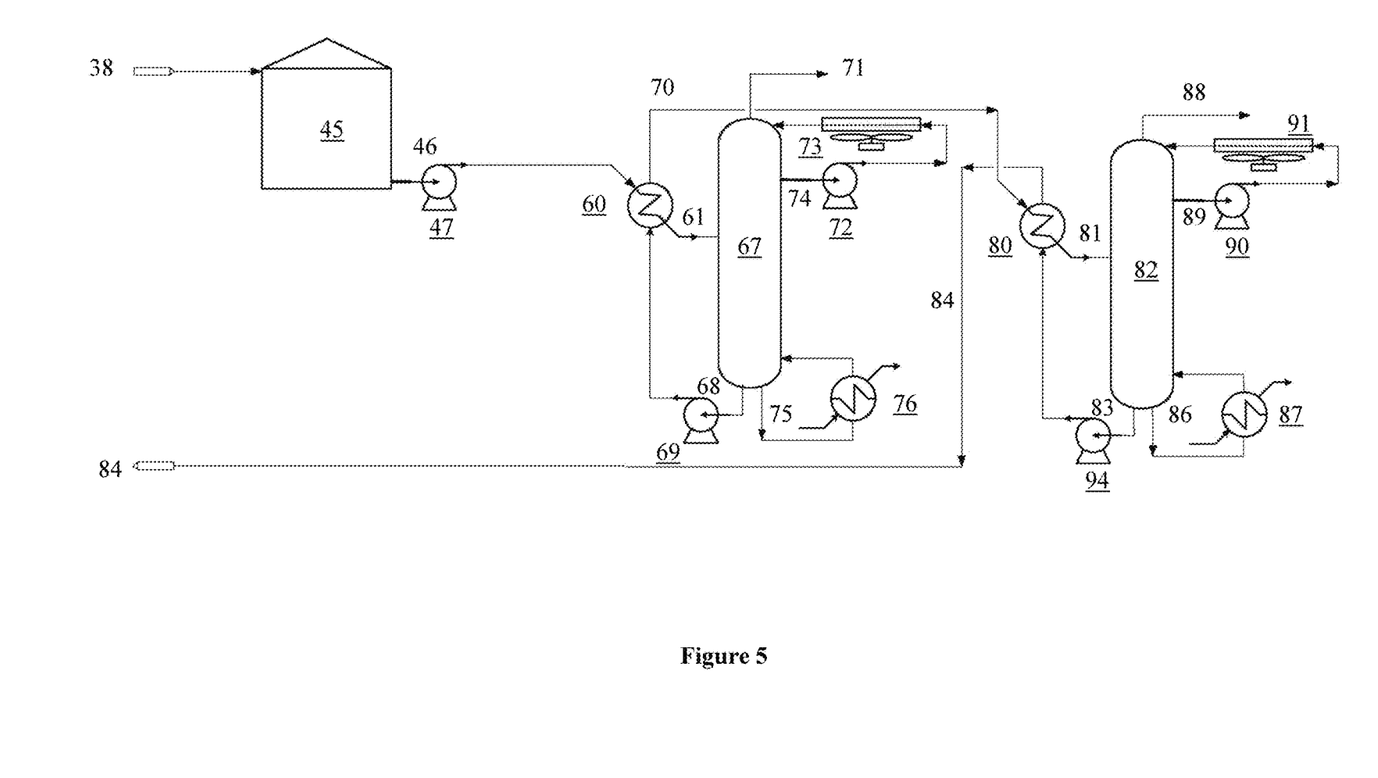
FIG. 5 is a schematic of a two stage sour water stripper.

FIG. 5 shows a two column steam stripper process for treating stream 38. First, stream 38 is routed to a feed tank 45 where a sufficient volume of sour water is accumulated prior to the stripper process. Feed tank 45 can also be configured to maintain a constant temperature, pressure, and flow rate for the stripper process. A pump 47 routes a stream 46 from tank 45 to a heat exchanger 60 where stream 46 is heated to a higher temperature stream 61 before feeding into a top region of stripper 67. As stream 61 falls to the bottom of stripper 67, rising steam removes contaminants from sour water stream 61. The pressure and temperature of stripper 67 is selected to optimize the removal of $H_2S$. A rich $H_2S$ top stream 71 exits the top of stripper 67 for use, disposal, or additional processing. Pump 72 draws a liquid stream 74 comprising mostly dissolved $H_2S$ and $NH_3$ from the top of stripper 67 and through a condenser 73 for reflux/cooling. Liquid stream 74 is cooled to a liquid and fed back into the top of stripper 67 as reflux to the stripper. A reboiler stream 75 is pulled from the bottom of stripper 67 and heated in a heat exchanger 76 before being routed back into the bottom of stripper 67. Reboiler stream 75 and heat exchanger 76 help to maintain the pool of liquid at the bottom of stripper 67 at a desired temperature to generate steam. A substantially $H_2S$ depleted stream 68 is pulled from the bottom of stripper 67 by pump 69 and routed to the heat exchanger 60 to heat stream 46. Stream 68 is cooled to a lower temperature stream 70 and then fed to heat exchanger 80 where it is heated to a higher temperature stream 81. Stream 81 is fed into a second stripper 82 for additional stripping. The temperature and pressure of stripper 82 are optimized to remove $NH_3$ from stream 81 as stream 81 falls to the bottom of stripper 82. For example, in some embodiments, it is contemplated that stripper 67 is operated at a temperature of 160°-180° C. and a pressure of 7-9 bar (ga), while stripper 82 is operated at a temperature of 120°-135° C. and a pressure of 1-2 bar (ga). A rich $NH_3$ top stream 88 exits the top of stripper 82 for use, disposal, or additional processing (e.g., scrubber, refrigeration system, etc.). Pump 90 draws a liquid stream 89 comprising mostly $NH_3$ from the top of stripper 82 and through a condenser 91 for reflux/cooling. Liquid stream 89 is cooled to a liquid and fed back into the top of stripper 82 for reflux to the stripper. A reboiler stream 86 is pulled from the bottom of stripper 82 and heated in a heat exchanger 87 before being routed back into the bottom of stripper 82. Reboiler stream 86 and heat exchanger 87 help to maintain the pool of liquid at the bottom of stripper 82 at a desired temperature to generate steam.

A substantially $H_2S$ and $NH_3$ depleted stream 83 is pulled from the bottom of stripper 82 by pump 94 and routed to heat exchanger 80 to heat stream 70. Stream 83 is cooled to a lower temperature stream 84 and routed to a biological treatment process.

In some embodiments, the inorganic carbon removal process shown in FIG. 2 can take place between the first stage and second stage of the stripping process in FIG. 5 (e.g., between stripper 67 and stripper 82). In a two column stripper, a provision for caustic dosing will also be provided between the two columns. This is to free additional bound $NH_3$. In some embodiments, the pH correction process shown in FIG. 3 can take place after the second column to facilitate biological treatment.

It is also contemplated that stripper 82 could also include a provision for adding caustic at several locations below a feed tray to facilitate stripping out of fixed ammonia.

Figure 6:
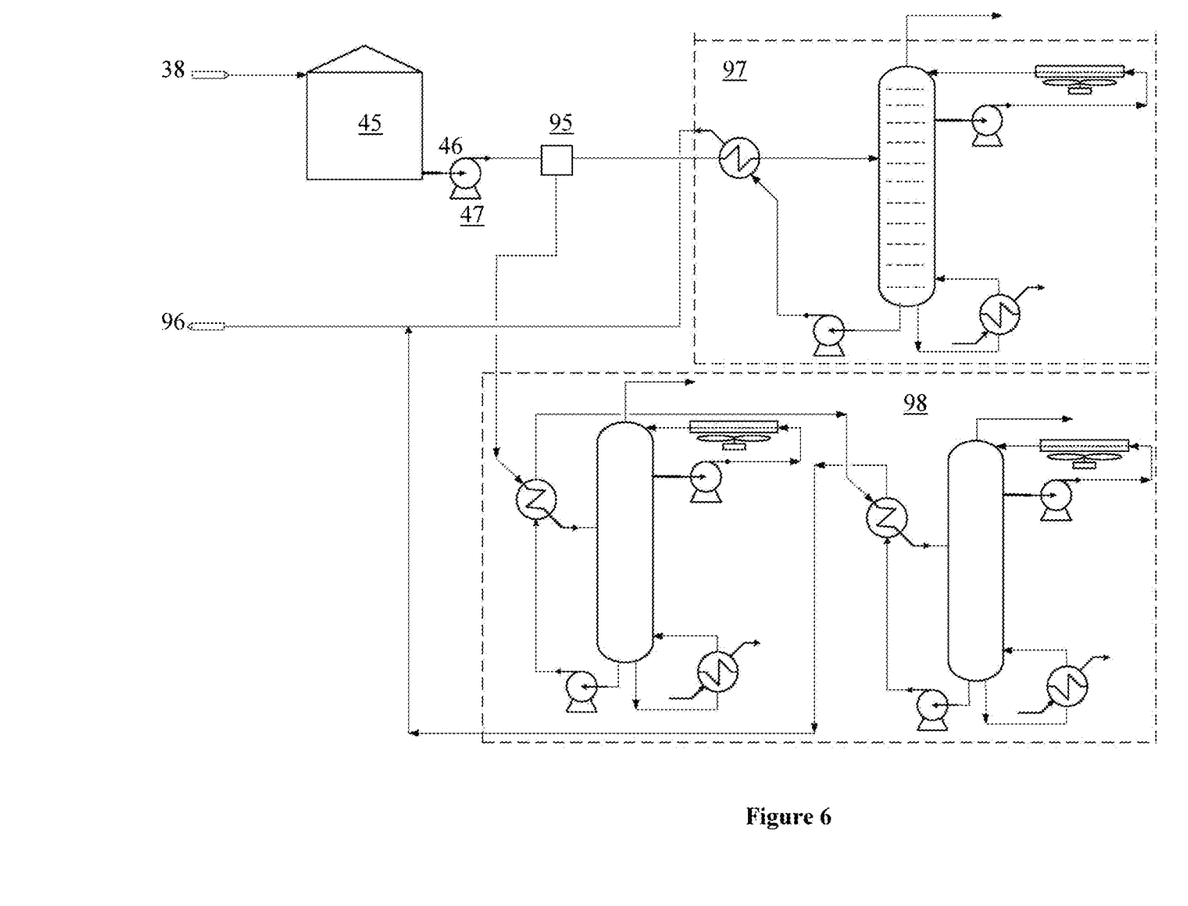
FIG. 6 is a schematic of a process for alternating between a single stage and a two stage sour water stripper.

FIG. 6 shows a process for treating sour water stream 38 via either a one stage stripper process 97, such as the one show in FIG. 4, or a two stage steam stripping process, such as the one shown in FIG. 5. Stream 38 is first fed into a feed tank 45, and then routed to a valve 95. Valve 95 controls the flow of stream 46 to either process 97 or process 98, or a combination of both, depending on the composition of stream 46. In preferred embodiments, valve 95 is coupled with one or more sensors and a control unit to automatically adjust/control the volume flow rate to process 97 and process 98, depending upon the upstream conditions. Once stream 46 passes through the steam stripping processes of process 97 and/or 98, a treated stream 96 is routed to a biological treatment process.

Figure 7:
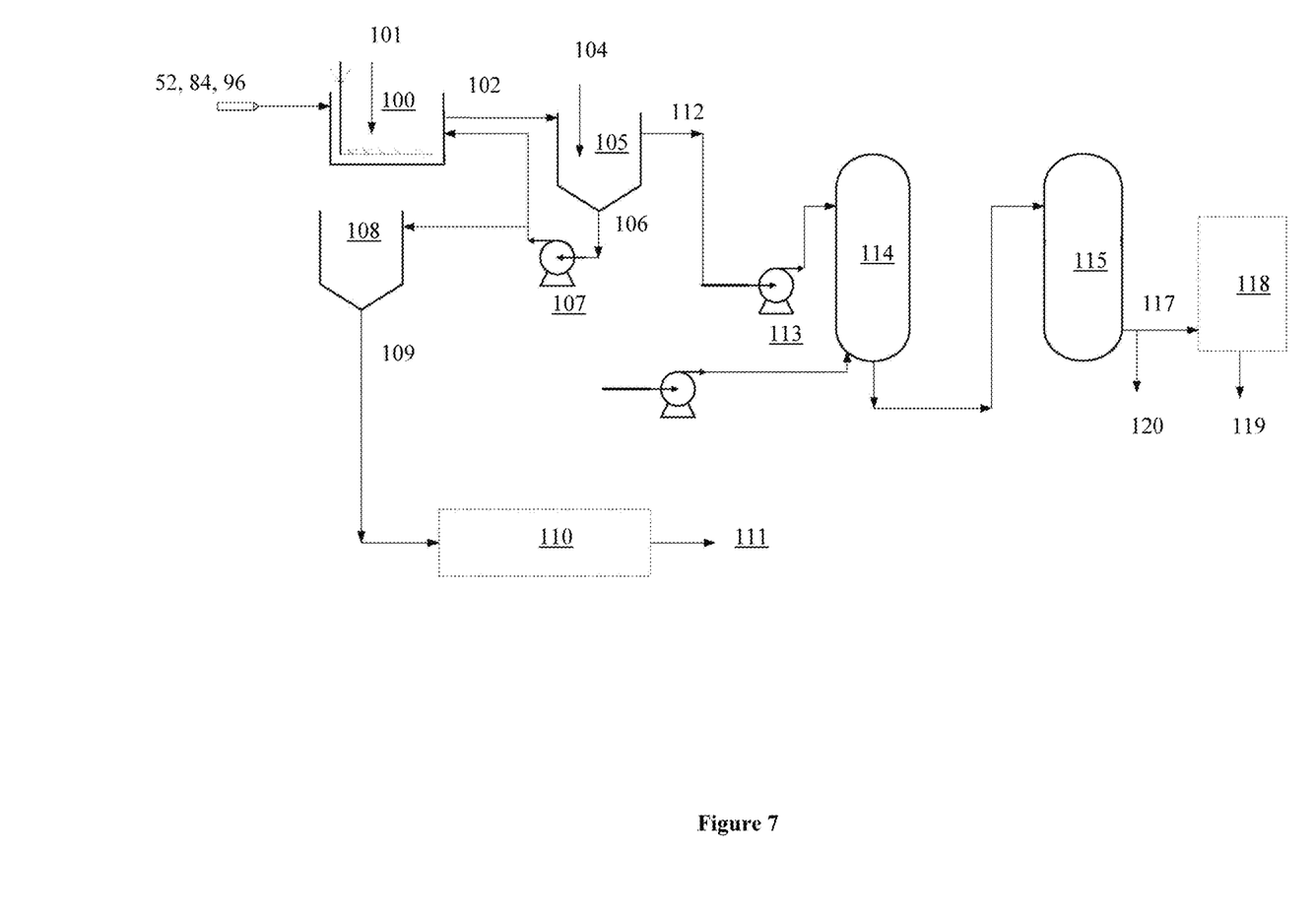
FIG. 7 is a schematic of a biological treatment process and solid removal process for treated sour water.

FIG. 7 shows an aerobic biological treatment process for treating stream 52, 84, and/or 96. Stream 52, 84, and/or 96 is routed to a biological treatment tank 100. Nutrients 101 (such as Nitrogen and phosphorus) are added to tank 100 and mixed with stream 52, 84, and/or 96 to remove thiocyanate and any unwanted organics (e.g., formate) and $NH_3$.

$SCN^- + 2O_2 + 2H_2O \rightarrow SO_4^{--} + CO_2 + NH_4^+$

Stream 102 is then routed to a clarifier 105 where coagulants 104 are added to remove suspended solids and solid particulates. Concentrated solids and impurities are discharged from the bottom of clarifier 105 as sludge stream 106. Pump 107 moves sludge stream 106 to a bio-sludge thickening tank 108 where sludge stream 106 is allowed to thicken into a thicker sludge stream 109. Stream 109 is then routed to a centrifuge filter press 110. After sludge stream 109 is pressed and filtered, it can be routed to a disposal process 111.

After stream 102 has been treated in clarifier 105, the resulting treated sour water stream 112 is routed to a multi-grade filter 114 and then an activated carbon filter 115 by pump 113. These additional filtration steps remove unwanted organics, contaminants, and solid particles, resulting in a treated water stream 117. Stream 117 can then be routed to a disposal process 120 or a water recovery process 118 for reuse in an industrial process 119 (e.g., coal gasification process, cooling water make-up).

Figure 8:
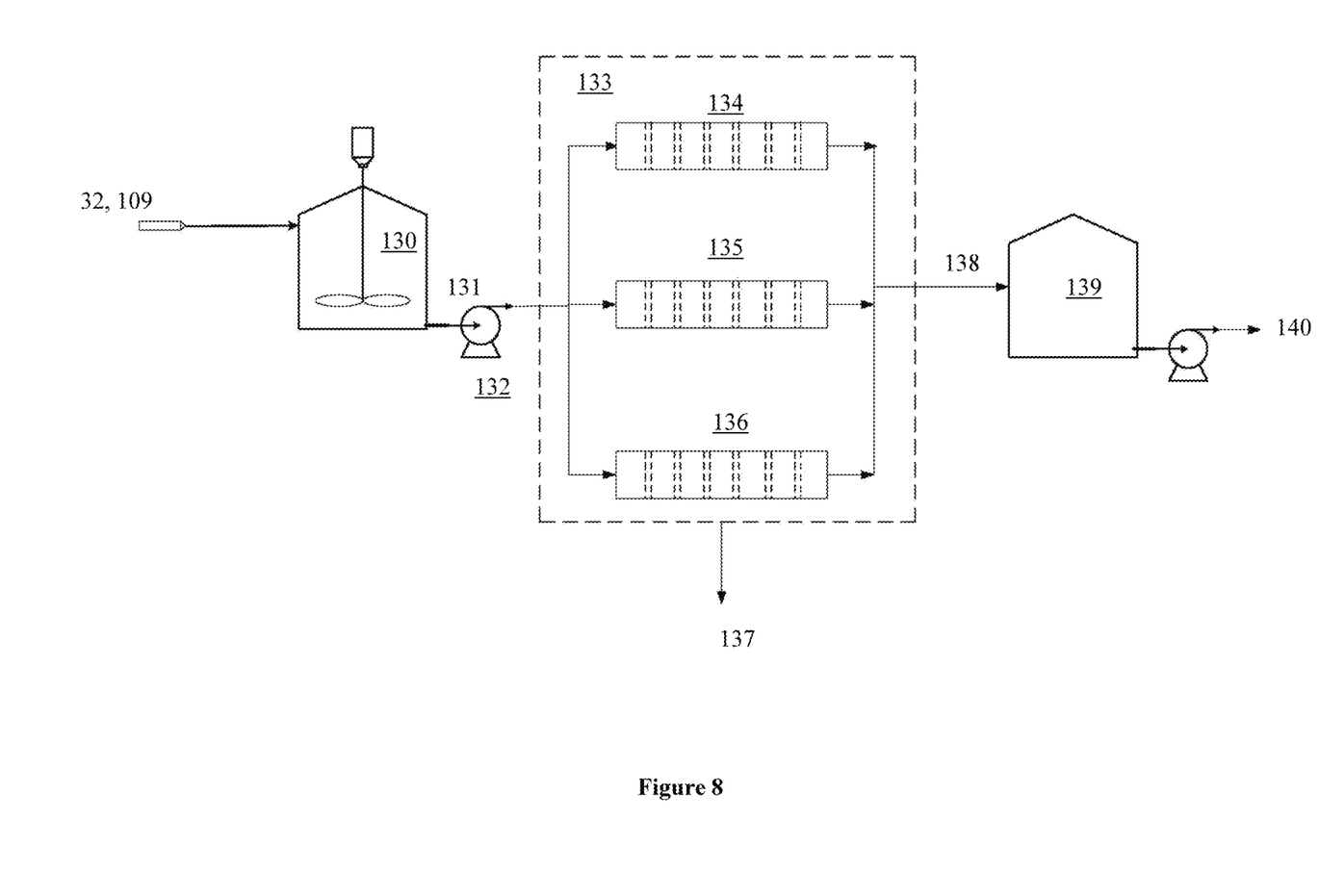
FIG. 8 is a schematic of a solids removal process for treating sludge produced from the $CO_2$ removal process of FIG. 2.

FIG. 8 shows a filter press process for treating sludge streams containing solid particles and suspended solids. Sludge stream 32 and/or sludge stream 109 from the prior processes is first routed to a slurry condition tank 130 where it is mixed with commercially available dewatering polyelectrolytes. Pump 132 routes the conditioned sludge stream 131 from tank 130 to a filter press process 133. Process 133 includes three or more filter-press elements 134, 135, and 136 that remove and compact solid particles from the sludge stream 131 as solid cakes 137. The filtered-pressed slurry stream 138 is then routed to a filtrate tank 139 and then pumped to a reaction process 140 such as the one shown in FIG. 2.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method of pre-treating a sour water stream originating from a coal gasification process and containing cyanides and carbon dioxide, the method comprising:
   injecting a polysulfide into the sour water stream, wherein the sour water stream comprises cyanides and carbon dioxide;
   converting at least some of the cyanides into thiocyanate in the sour water stream in response to the injecting;
   acidifying the sour water stream to produce an acidified sour water stream;
   stripping at least a portion of any $H_2S$, $NH_3$, or both from the acidified sour water stream using a stripping system comprising a one stage stripper and a two stage stripper arranged in parallel, wherein the one stage stripper comprises a single column steam stripper configured to receive the acidified sour water stream, dose a caustic into the acidified source water stream within the single column steam stripper, and strip at least a portion of the $H_2S$, $NH_3$, or both within the single column steam stripper, and wherein the two stage stripper comprises a first steam stripper column configured to remove $H_2S$ from the acidified sour water stream, a second steam stripper column downstream of the first steam stripper column and configured to remove $NH_3$, and a caustic injection point between the first steam stripper column and the second steam stripper column;
   dosing a caustic into the acidified sour water stream during the stripping in the stripping system; and
   stripping at least a portion of the $H_2S$, $NH_3$, or both downstream of the dosing with the caustic in the stripping system.

2. The method of claim 1, further comprising the step of routing the sour water stream through an equalization tank prior to injecting the polysulfide.

3. The method of claim 1, wherein the polysulfide is atomized prior to being injected into the sour water stream.

4. The method of claim 1, wherein the polysulfide is ammonium polysulfide.

5. The method of claim 1, wherein the polysulfide is injected into the sour water stream in a direction that is counter to the direction of flow of the sour water stream.

6. The method of claim 1, wherein the polysulfide is injected into the sour water stream in the same direction of flow as the sour water stream.

7. The method of claim 1, further comprising the steps of:
   routing the sour water stream to a reaction tank downstream of the injecting and upstream of the acidifying; and
   injecting reactants for removal of inorganic carbon and other scale forming chemicals into the reaction tank such that at least some of the carbon dioxide present is precipitated.

8. The method of claim 7, wherein the reactant comprises one or more of lime, soda ash, sodium hydroxide (NaOH), and calcium chloride (CaCl2).

9. The method of claim 7, further comprising:
   allowing the sour water stream and the polysulfide to mix prior to routing the sour water stream to the reaction tank by providing a minimum length of conduit between the injection and the reaction tank.

10. The method of claim 7, further comprising:
    operating a mixer inside the reaction tank; and
    mixing of the carbon dioxide in its various forms and the one or more of lime, soda ash, sodium hydroxide (NaOH), and calcium chloride (CaCl2) with the mixer.

11. The method of claim 7, further comprising the steps of:
    routing the sour water stream and the reacted carbon dioxide in various forms from the reaction tank to a solid settler, and
    separating solid particles from the sour water stream while the sour water stream is in the solid settler.

12. The method of claim 11, wherein the step of routing the sour water stream and the absorbed carbon dioxide from the reaction tank to the solid settler comprises pumping the sour water stream from out of the bottom of the reaction tank and to the solid settler.

13. The method of claim 11, further comprising the steps of:
routing the sour water stream from the solid settler to a pH correction tank; and
wherein acidifying the sour water to produce the acidified sour water comprises injecting an acid into the pH correction tank.

14. The method of claim 13, further comprising the steps of:
mixing the acid and sour water stream in the pH correction tank for a time that is sufficient to acidify the sour water stream;
routing the sour water stream from the pH correction tank to a multi-grade filter, and
removing the solid particles from the sour water stream as the sour water stream passes through the multi-grade filter.

15. The method of claim 14, further comprising the step of routing the sour water stream from the multi-grade filter to a feed tank.

16. The method of claim 15, further comprising the steps of:
routing the sour water stream from the feed tank to the stripping system.

17. The method of claim 1, further comprising the steps of:
routing the substantially thiocyanate-depleted water stream from the biological treatment tank to a clarifier,
adding coagulants to the clarifier to produce a coagulated thiocyanate-depleted water stream;
routing the coagulated thiocyanate-depleted water stream to a multigrade filter,
removing solids from the stream as it passes through the filter, and
routing the stream to an activated carbon filter to remove at least some organics in the stream to produce a treated water stream.

18. The method of claim 17, further comprising the step of routing the treated water stream to a coal gasification or cooling water make-up process for reuse.

19. The method of claim 1, further comprising;
routing the sour water stream to a biological treatment tank downstream of the stripping;
adding nutrients to the biological treatment tank; and
removing at least some of the thiocyanate to produce a substantially thiocyanate-depleted water stream in the biological treatment tank.

20. The method of claim 1, wherein stripping at least a portion of any $H_2S$, $NH_3$, or both from the acidified sour water stream using the stripping system comprises: stripping a first portion of the acidified sour water stream in the one stage stripper, and stripping a second portion of the acidified sour water stream in the two stage stripper.

* * * * *